United States Patent [19]

Yoshida

[11] Patent Number: 5,576,611
[45] Date of Patent: Nov. 19, 1996

[54] BATTERY CHARGING SYSTEM

[75] Inventor: Takeshi Yoshida, Fukuoka, Japan

[73] Assignee: Matsysguta Electric Indistrial Co., Ltd., Kadoma, Japan

[21] Appl. No.: 339,934

[22] Filed: Nov. 15, 1994

[30] Foreign Application Priority Data

Nov. 16, 1993 [JP] Japan ..................... 5-286449

[51] Int. Cl.⁶ ................. H02J 7/04; H01M 10/44
[52] U.S. Cl. ................. 320/31; 320/21; 320/35; 320/39
[58] Field of Search ................. 320/5, 9, 11, 21, 320/31, 32, 33, 35, 39; 364/707

[56] References Cited

U.S. PATENT DOCUMENTS

| | | | |
|---|---|---|---|
| 5,185,565 | 2/1993 | Uchida | 320/39 |
| 5,274,320 | 12/1993 | Yamaguchi | 320/31 |
| 5,371,456 | 12/1994 | Brainard | 320/31 |
| 5,493,199 | 2/1996 | Koenck et al. | 320/35 |
| 5,519,302 | 5/1996 | Mino et al. | 320/21 |

FOREIGN PATENT DOCUMENTS

| | | |
|---|---|---|
| 4-156235 | 5/1992 | Japan . |
| 5-137270 | 6/1993 | Japan . |

*Primary Examiner*—Peter S. Wong
*Assistant Examiner*—Patrick B. Law
*Attorney, Agent, or Firm*—Ratner & Prestia

[57] ABSTRACT

A battery charging system which charges a battery in an electric appliance. The battery charging system includes circuitry to supply a charging current from a power supply circuit to the battery which is connected to a load appliance. Also included is a voltage detecting circuit which detects the battery terminal voltage to determine the completion of charging. When the load appliance is operated causing a change in the consumption of electric current, the control circuit suspends operation of the voltage detection circuit. As a result, the change of terminal voltage caused by the change of current consumption is not detected, and erroneous "full-charge" detection is prevented.

18 Claims, 5 Drawing Sheets

BATTERY CHARGING SYSTEM

BACKGROUND OF THE INVENTION

The present invention relates to a charging system for a battery and particularly, to a charging system for a battery used in portable or small electric appliances.

BACKGROUND OF THE INVENTION

The use of chargeable secondary batteries as compared to non-chargeable primary batteries, such as a manganese battery, has increased. The rechargeable batteries include, for example, Ni-Cd batteries and compact lead-acid batteries.

Many battery-powered appliances are portable and, as a result, the battery discharge time limits the operating time of such appliances. In other words, once the battery has discharged, the battery must be charged or replaced with a charged battery. As a result, the appliances are out of operation while the battery is replaced. However, if interruptions in the operation of the appliance are not allowable, then the battery needs to be charged while the appliance is in operation.

FIG. 5 is a block diagram of a prior art battery charging system. Battery pack 1 houses battery 2, and has terminals 1a and 1b for charging and terminals 1c and 1d for discharging. Terminals 1a and 1c are connected to the positive terminal of battery 2 and terminals 1b and 1d are connected to the negative terminal of battery 2.

LOAD APPLIANCE 3 is driven by battery 2 as its main power source, and has its terminals 3a and 3b respectively connected to discharge terminals 1c and 1d of battery pack 1 to receive electric power from battery 2.

Charger 4 has terminals 4a and 4b, which are respectively connected to terminals 1a and 1b of battery pack 1. Charger 4 charges battery 2 by supplying electric power to battery 2 through terminals 4a and 4b. VOLTAGE DETECTION CIRCUIT 5 detects the terminal voltage of battery 2. Resistor 6 is connected in series to a charging line. CURRENT DETECTION CIRCUIT 7 is connected to resistor 6 to detect the charging current. POWER SUPPLY CIRCUIT 8 supplies electric power to battery 2. The charging current from POWER SUPPLY CIRCUIT 8 to battery pack 1 is controlled by CURRENT CONTROL CIRCUIT 9. CONTROL CIRCUIT 10 controls the function of CURRENT CONTROL CIRCUIT 9 using a value of the charging current detected by CURRENT DETECTION CIRCUIT 7 to maintain a constant charging current.

The operation of above-mentioned configuration is described with reference to FIG. 6 and FIG. 7. FIG. 6 is a graph of the change in the charging quantity when power consumption of LOAD APPLIANCE 3 is constant. FIG. 7 is a graph of the change in the charging quantity when power consumption of LOAD APPLIANCE 3 varies. In FIG. 6 and FIG. 7, the vertical axis indicates battery terminal voltage v and the horizontal axis charging time t. At time t0, the power consumption of LOAD APPLIANCE 3 showed a steep increase during charging. Time tS is the time when quick charging is normally completed.

When terminals 4a and 4b of charger 4 are respectively connected with terminals 1a and 1b of battery pack 1, electricity is supplied from POWER SUPPLY CIRCUIT 8 via CURRENT CONTROL CIRCUIT 9 to battery 2 to start charging. During charging, the electric current flowing through terminals 4a and 4b is detected by CURRENT DETECTION CIRCUIT 7; and in response to the detected electric current, CONTROL CIRCUIT 10 controls CURRENT CONTROL CIRCUIT 9 to maintain a constant charging current.

The electric current also flows to LOAD APPLIANCE 3 if LOAD APPLIANCE 3 is connected with battery pack 1 when charging. Accordingly, the charging current provided to battery 2 equals the output current from CURRENT CONTROL CIRCUIT 9 minus the current consumed by LOAD APPLIANCE 3.

The charging current supplied to battery pack 1 is maintained constant when charging system 4. Therefore, if there is no change during charging in the operation of LOAD APPLIANCE 3, the charging current provided to battery 2 stays at a fixed value, and the change in battery 2 terminal voltage as detected by VOLTAGE DETECTION CIRCUIT 5 remains equal to the battery 2 terminal voltage without LOAD APPLIANCE 3, as shown in FIG. 6.

The full-charge of battery 2 can be detected and charging can be safely terminated at point tS by detecting a drop of the full-charge point terminal voltage of battery 2.

In the prior art charging system, however, when LOAD APPLIANCE 3 changes causing increased power consumption, the current for charging battery 2 decreases, and energy stored within battery 2 starts to flow to LOAD APPLIANCE 3. This causes a voltage drop during charging of the terminal voltage of battery 2 even though battery 2 has not reached the full-charge point. As a result, the prior art system experiences termination of quick charging although charging of the battery is not completed.

SUMMARY OF THE INVENTION

The exemplary embodiment of the present invention relates to a battery charging system that offers safe and failure-free charging when the operating condition of the load appliance changes causing unstable voltage fluctuation at the battery terminals.

An exemplary embodiment of the present invention includes a power supply circuit to supply electric current to charge a secondary battery which is connected to a load appliance. Also included is a charging completion detection circuit that detects the completion of charging of the secondary battery and a control circuit that suspends the operation of the charging completion detection circuit in response to a change in operation of the load appliance. Accordingly, "full-charge" detection due to a change in terminal voltage caused by a change in the operating condition of the load appliance is prevented by suspending detection of the "full-charge" signal from the secondary battery when the load appliance causes a change in the secondary battery terminal voltage.

DESCRIPTION OF THE PREFERRED EMBODIMENT

Figure 1:
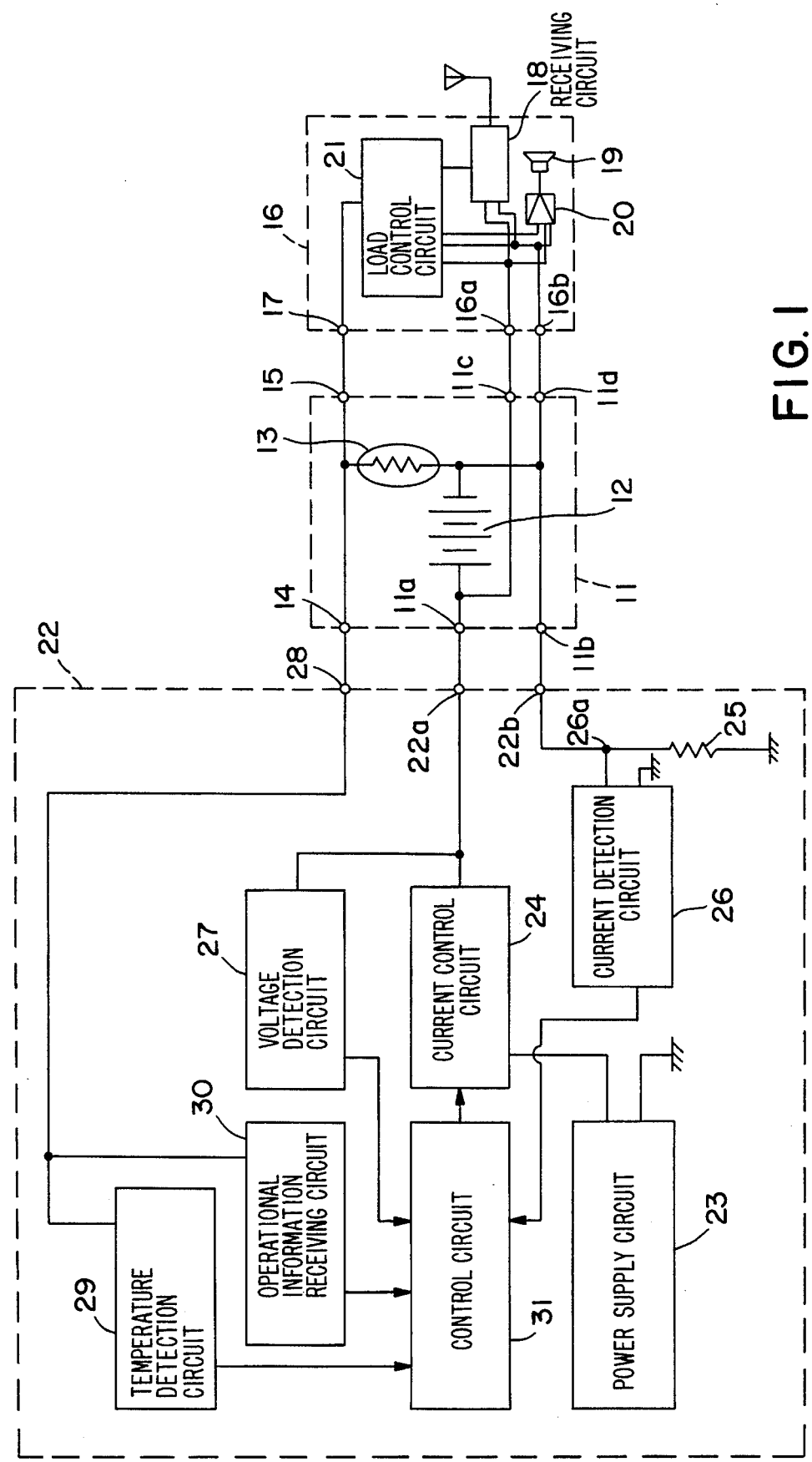
FIG. 1 is a block diagram of the battery charging system according to an exemplary embodiment of the present invention.

FIG. 1 is a block diagram of a battery charging system according to an exemplary embodiment of the present invention.

As illustrated in FIG. 1, battery pack 11 includes battery 12, a secondary battery. Battery pack 11 also includes charging terminals 11a, 11b and discharge terminals 11c, 11d. Terminals 11a and 11c are connected to the positive terminal of battery 12 and terminals 11b and 11d are connected to the negative terminal of battery 12. In addition, battery pack 11 includes thermistor 13, which is electrically connected to terminals 14 and 15 at one end, and terminal 11b at the other end.

A slave unit of cordless telephone 16 (hereinafter referred to as telephone) is an exemplary load appliance which uses the power supplied from battery 12 in battery pack 11. Terminals 16a and 16b are connected, respectively, to terminals 11c and 11d of battery pack 11. Terminal 17 is connected to terminal 15. RECEIVING CIRCUIT 18 receives signals transmitted from a host telephone unit (not illustrated). Speaker 19 is driven by speaker driving circuit 20. When RECEIVING CIRCUIT 18 receives telephone signals, LOAD CONTROL CIRCUIT 21 provides signals to speaker driving circuit 20 to drive speaker 19, and, at the same time, LOAD CONTROL CIRCUIT 21 provides an operational information signal to terminal 17.

Charger 22 has terminals 22a and 22b respectively connected to terminal 11a and 11b of battery pack 11 and supplies a charging current to battery 12 via these terminals. POWER SUPPLY CIRCUIT 23 supplies electric power to battery 12. Electric current that flows from POWER SUPPLY CIRCUIT 23 to battery pack 11 is controlled by CURRENT CONTROL CIRCUIT 24. Resistor 25 is connected between terminal 22b and ground. The current is detected by connecting detection terminal 26a, which is connected to resistor 25, with CURRENT DETECTION CIRCUIT 26. VOLTAGE DETECTION CIRCUIT 27 detects the terminal voltage at terminal 22a to detect the completion of charging of battery 12. Terminal 28 is connected to terminal 14 of battery pack 11, and receives a signal from thermistor 13 which is provided to TEMPERATURE DETECTION CIRCUIT 29. Temperature detection circuit 29 detects the temperature of battery 12. OPERATIONAL INFORMATION RECEIVING CIRCUIT 30 is coupled to terminal 28 to receive the operational information signal provided from LOAD CONTROL CIRCUIT 21 via terminals 17, 15, 14 and 28. CONTROL CIRCUIT 31 controls the operation of CURRENT CONTROL CIRCUIT 24 using the information provided from CURRENT DETECTION CIRCUIT 26, VOLTAGE DETECTION CIRCUIT 27, TEMPERATURE DETECTION CIRCUIT 29, and OPERATIONAL INFORMATION RECEIVING CIRCUIT 30. CONTROL CIRCUIT 31 terminates charging by judging, based on the voltage information detected by VOLTAGE DETECTION CIRCUIT 27, whether the terminal voltage is dropping. In addition, depending on the operational condition of the load appliance 16, the functioning of VOLTAGE DETECTION CIRCUIT 27 is suspended.

The operation of the battery charging system is explained below. When terminals 11a, 11b and 14 of battery pack 11 are respectively connected to terminals 22a, 22b and 28 of charger 22, charging electricity flows from POWER SUPPLY CIRCUIT 23 to CURRENT CONTROL CIRCUIT 24 to battery 12 to resistor 25 and to POWER SUPPLY CIRCUIT 23 to begin charging. CURRENT DETECTION CIRCUIT 26 detects the amount of charging current and provides a detection signal to CONTROL CIRCUIT 31 based on the detected amount. Based on the detection signal, CONTROL CIRCUIT 31 controls the operation of CURRENT CONTROL CIRCUIT 24 to maintain constant charging current.

Meanwhile, VOLTAGE DETECTION CIRCUIT 27 detects terminal 22a and provides the detected voltage to CONTROL CIRCUIT 31. Terminal 22a is connected via terminal 11a to the positive terminal of battery 12. Therefore, the voltage of terminal 22a is equal to the voltage the positive terminal of battery 12. In other words, the detection signal provided from VOLTAGE DETECTION CIRCUIT 27 represents the voltage of the positive terminal of battery 12. CONTROL CIRCUIT 31 monitors the voltage detection signal from VOLTAGE DETECTION CIRCUIT 27. When the voltage is determined to have shifted from an upward trend to a downward trend, the operation of CURRENT CONTROL CIRCUIT 24 is suspended, and charging ends.

TEMPERATURE DETECTION CIRCUIT 29 detects the temperature of battery 12 by receiving a signal from thermistor 13 which is conveyed to CONTROL CIRCUIT 31. If the detected signal indicates the temperature of the battery 12 has exceeded a predetermined value, CONTROL CIRCUIT 31 suspends operation of CURRENT CONTROL CIRCUIT 24, and charging ends.

During the aforementioned charging operation, if RECEIVING CIRCUIT 18 of telephone 16 receives a call from its host telephone unit, LOAD CONTROL CIRCUIT 21 makes speaker driving circuit 20 drive speaker 19 to generate a call receiving sound, and, at the same time, provides the operational information signal to terminal 17. Upon receipt of the operation informal signal, OPERATIONAL INFORMATION RECEIVING CIRCUIT 30 provides a signal to CONTROL CIRCUIT 31. Then, CONTROL CIRCUIT 31, responding to the signal from INFORMATION RECEIVING CIRCUIT 30, provides a signal to VOLTAGE DETECTION CIRCUIT 27 causing voltage detection circuit 27 to suspend detection of the voltage. VOLTAGE DETECTION CIRCUIT 27 resumes detection of battery 12 voltage when the current consumption of telephone 16 returns to the original state, namely, when the output from CURRENT DETECTION CIRCUIT 26 returns to the same state before the operational information signal was sent.

As explained above, when telephone 16 begins operation, for example, when speaker 19 of telephone 16 generates a call receiving sound, i.e. a beep sound, a change in the current consumption of telephone 16 results, and LOAD CONTROL CIRCUIT 21 of telephone 16 provides an operational information signal to charger 22. Based on this signal, CONTROL CIRCUIT 31 suspends voltage detecting of VOLTAGE DETECTION CIRCUIT 27. Therefore, even if the voltage of battery 12 drops as a result of the increased power consumption of telephone 16, the voltage drop is not detected. Accordingly, the voltage drop that occurs when battery 12 reaches "full-charge" stage can be detected. Using the above procedure, the erroneous detection of a voltage drop caused as a result of a change in power consumption of telephone 16 as an indication of charging completion is prevented.

Figure 2:
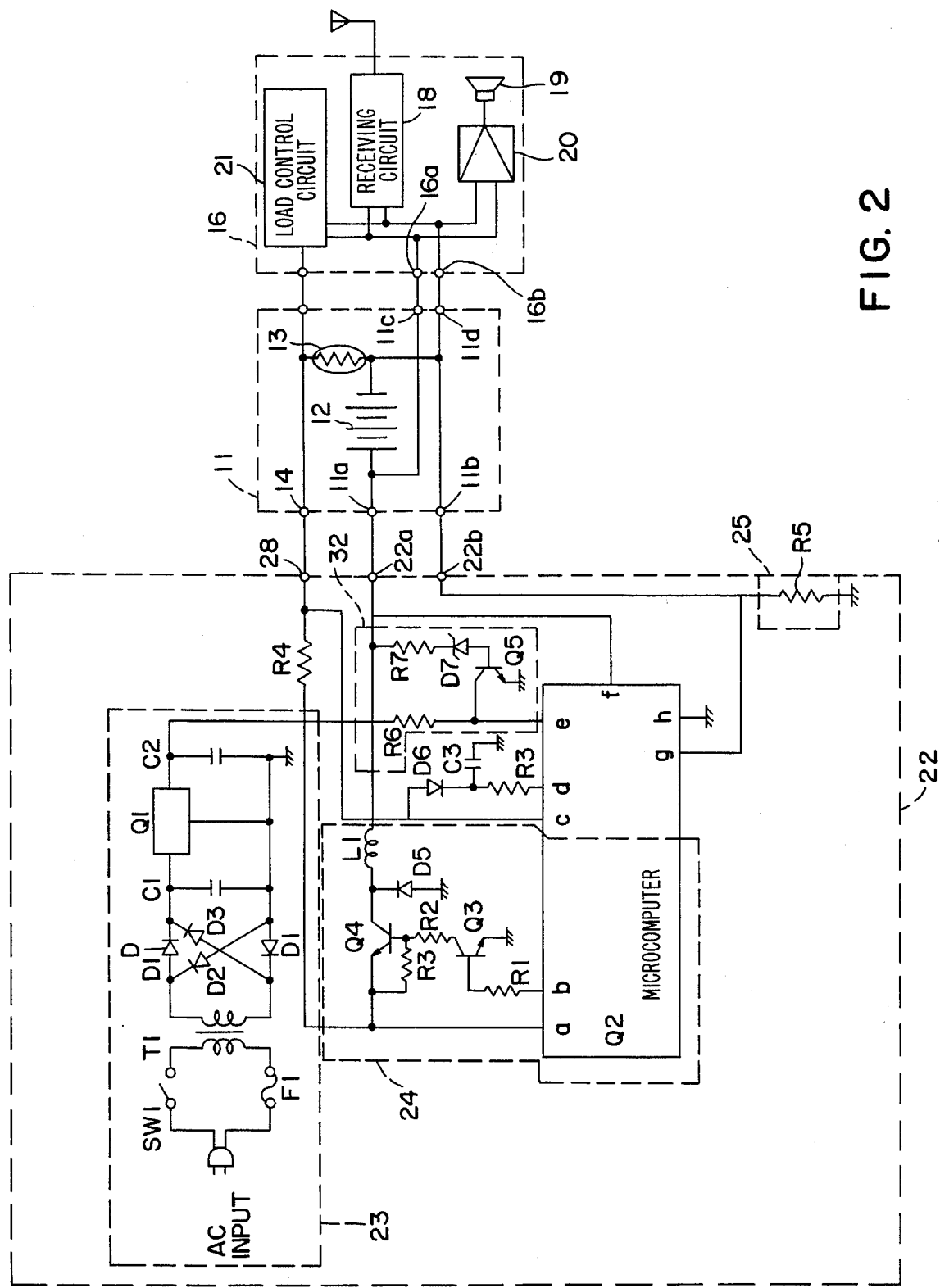
FIG. 2 is a circuit diagram of the charging system shown in FIG. 1.

FIG. 2 is a detailed illustration of the exemplary embodiment. As shown in FIG. 2, POWER SUPPLY CIRCUIT 23 has main switch SW1 coupled in series to AC INPUT and in parallel to use F1. Fuse F1 and main switch SW1 are each coupled to the primary side of transformer T1. The secondary side of transformer T1 is coupled to bridge diode D made up of diodes D1, D2, D3 and D4. Coupled at the output side of bridge diode D are smoothing capacitors C1, C2 and DC stabilizing power supply integrated circuit Q1.

MICROCOMPUTER Q2 includes (1) a built-in A/D converter, (2) a power source terminal which is coupled to the output of POWER SUPPLY CIRCUIT 23, (3) terminal b for driving the PWM circuit, (4) terminal c coupled to input voltage regulation signal, (5) terminal d for receiving a thermal change signal, (6) terminal e for receiving input abnormal voltage detection signal, (7) a battery voltage input terminal f coupled to the analog side of built-in A/D converter, (8) terminal g for receiving charging current detection signal, and (9) ground terminal h.

VOLTAGE DETECTION CIRCUIT 27 shown in FIG. 1 is equivalent to the A/D converter in MICROCOMPUTER Q2 and MICROCOMPUTER Q2 which detects the output from the A/D converter.

Terminal c of MICROCOMPUTER Q2 is connected to terminal 28, and terminal d is connected to terminal 28 via an integrating circuit including diode D6, capacitor C3, and resistor R3.

CURRENT CONTROL CIRCUIT 24 includes PWM circuit having transistors Q3, Q4, diode D5, coil L1, and MICROCOMPUTER Q2. CURRENT CONTROL CIRCUIT 24 controls the charging current for battery 12 in response to a pulse signal generated from terminal b of MICROCOMPUTER Q2.

Resistor R5 is connected to terminal 22b and terminal g of MICROCOMPUTER Q2 at one end, and to ground at the other end. Resistor R5 corresponds to resistor 25 of FIG. 1.

Terminal 28 is connected via resistor R4 to the output of POWER SUPPLY CIRCUIT 23, and to terminal c of MICROCOMPUTER Q2. Terminal 28 is also connected to terminal d of MICROCOMPUTER Q2 via an integrating circuit including diode D6, capacitor C3, and resistor R3.

Figure 3:
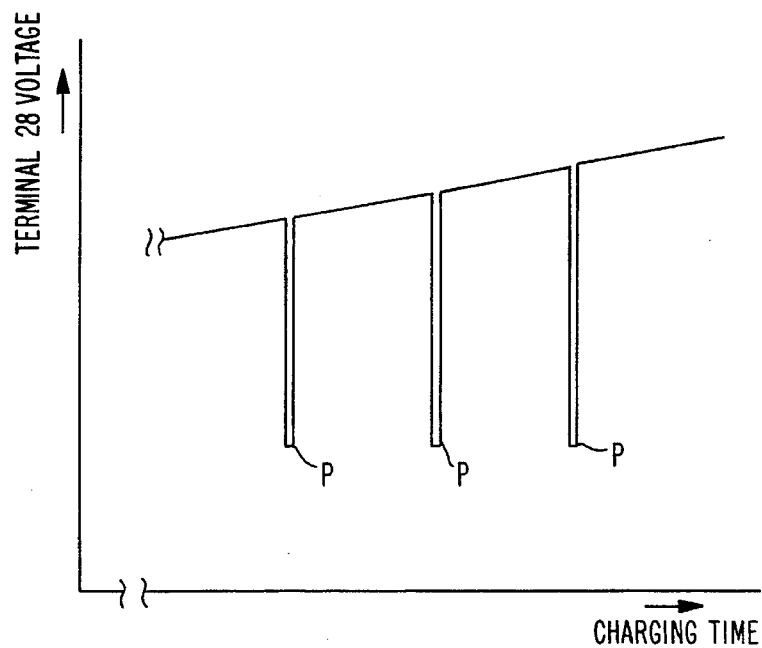
FIG. 3 is a graph illustrating the change in terminal voltage of the charging system shown in FIG. 1.

The operational information signal of LOAD CONTROL CIRCUIT 21 is provided as a pulse signal sent at regular intervals, and is conveyed to charger 22 through terminal 14 together with the output of thermistor 13. Consequently, the voltage of terminal 28 is the superimposed voltage of thermistor 13 plus the regular pulses of operational information signal P as shown in FIG. 3.

Abnormal voltage detection circuit 32 detects an abnormal voltage of battery 12, and is formed by connecting resistor R6 between the output of POWER SUPPLY CIRCUIT 23 and MICROCOMPUTER Q2; connecting one end of resistor R7 to the output of CURRENT CONTROL CIRCUIT 24, and the other end to the cathode of zener diode D7; and connecting the base of PNP transistor Q5 to the anode of zener diode D7, and the collector of PNP transistor Q5 to terminal e of MICROCOMPUTER Q2, and the emitter of PNP transistor Q5 to ground.

Figure 4:
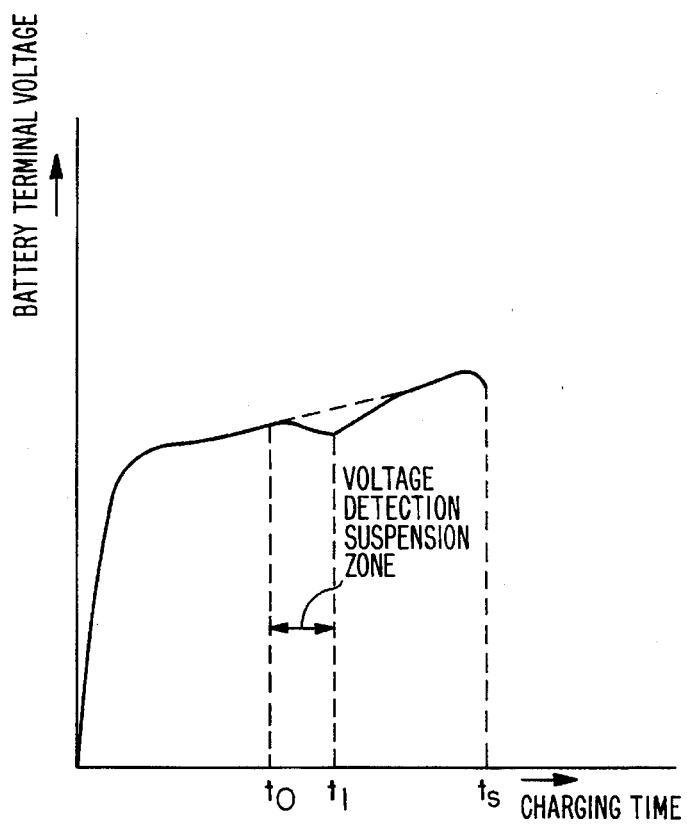
FIG. 4 is a graph illustrating the change in the charging quantity of the charging system shown in FIG. 1.
Figure 5:
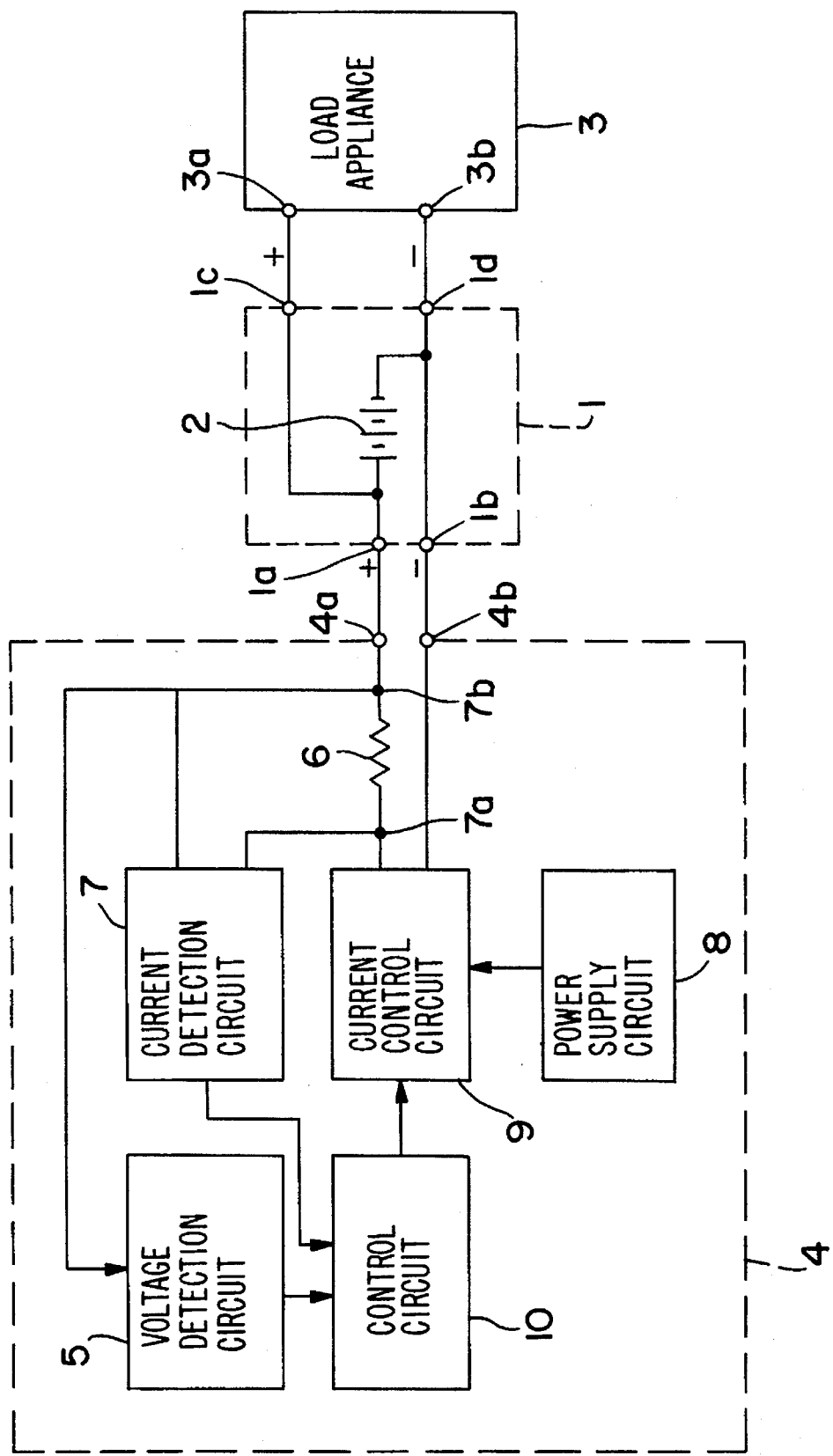
FIG. 5 is block diagram of a prior art charging system.
Figure 6:
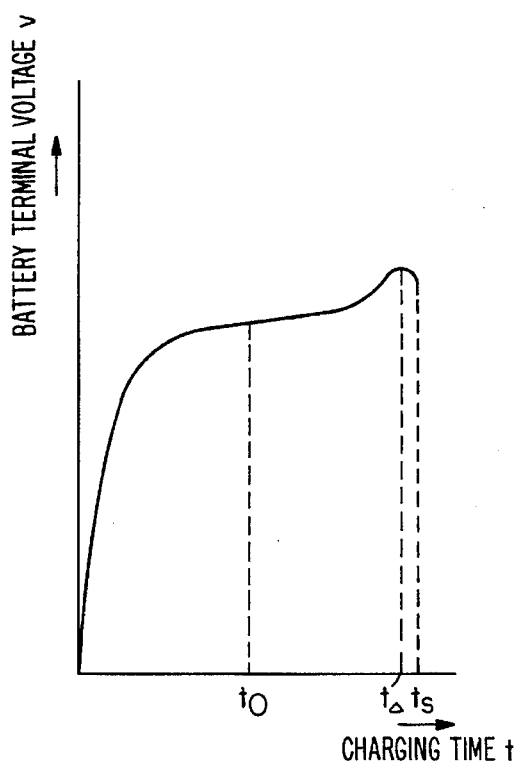
FIG. 6 illustrates a change in charging quantity when power consumption of the load appliance is constant in the prior art system shown in FIG. 5.
Figure 7:
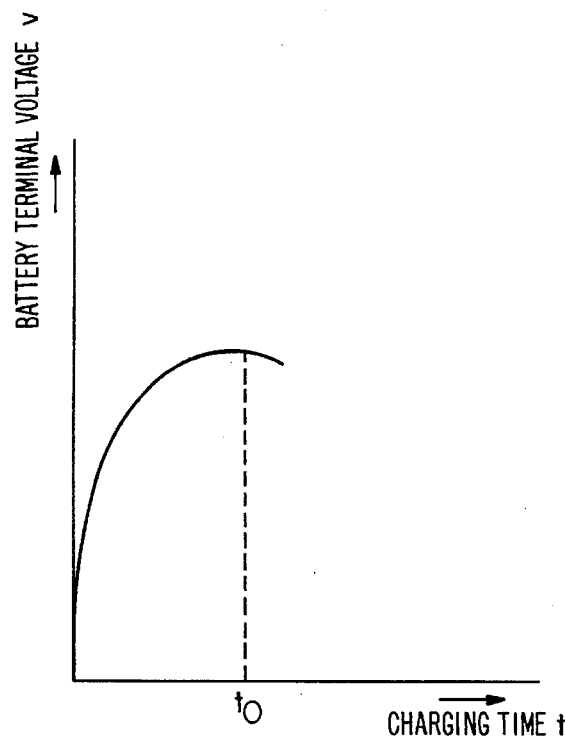
FIG. 7 illustrates a change in the charging quantity when power consumption of the load appliance changes in the prior art system.

Operation of the above setup will be explained with reference to FIG. 4. FIG. 4 illustrates a change of the charging quantity in the battery charging system; where the vertical axis indicates voltage of battery 12 terminal which is the charging quantity, and the horizontal axis is the charging time. At time t0, a call receiving sound of telephone 16 is generated. At time t1, the power consumption of telephone 16 is returned to a normal level. At time tS, quick charging of battery pack 11 is completed.

When SW1 is turned ON, POWER SUPPLY CIRCUIT 23 changes the voltage of electricity from AC INPUT with transformer T1, rectifies it with bridge diode D, and supplies it to each of the sections after stabilizing it with power supply stabilizing integrated circuit Q1 and capacitors C1 and C2.

Then, when battery pack 11 is connected with charger 22, the charging current flows from POWER SUPPLY CIRCUIT 23 to battery pack 11 via CURRENT CONTROL CIRCUIT 24. The charging current flows to battery 12 to terminal 11b to terminal 22b and to resistor R5. The voltage at each end of resistor R5 is provided to MICROCOMPUTER Q2 via terminal g. MICROCOMPUTER Q2, using the A/D converter, converts the voltage into current information. Based on this current information, the pulse output of terminal b is changed to maintain a constant current output from CURRENT CONTROL CIRCUIT 24. Particularly, transistor Q3 of CURRENT CONTROL CIRCUIT 24 switches in response to the pulse received from terminal b of MICROCOMPUTER Q2. In reply to the switching operation of transistor Q3, switching circuit including transistor Q4, diode D5, and coil L1, controls the output from POWER SUPPLY CIRCUIT 23. Thus, the amount of current is controlled.

At this time, the terminal voltage of thermistor 13 in battery pack 11 is provided to terminal c of MICROCOMPUTER Q2 via terminal 14, terminal 28, and the integrating circuit including diode D6, resistor R3, and capacitor C3. If thermistor 13 terminal voltage shows a steep change, or a voltage value which indicates that the temperature of the battery 12 has exceeded the rated value, MICROCOMPUTER Q2 suspends the pulse supply to terminal b to halt charging. During this time, the operational information signal, a pulse signal, from LOAD CONTROL CIRCUIT 21 is generated, and the integrating circuit cancels the pulse signal preventing the pulse signal from reaching terminal d.

When battery 12 voltage exceeds a predetermined value, this is conveyed to the base of transistor Q5 via resistor R7 and diode D7 causing the collector of transistor Q5 to go to a "LOW" level. This signal is conveyed to terminal e of MICROCOMPUTER Q2. Upon receiving the signal, MICROCOMPUTER Q2 stops supplying pulses to terminal b so the operation of CURRENT CONTROL CIRCUIT 24 is suspended and charging is stopped.

When the regular interval pulse signal, the operational information signal, is provided from LOAD CONTROL CIRCUIT 21 of telephone 16 to terminal 17, the pulse is conveyed to terminal c of MICROCOMPUTER Q2. Responding to the signal input, MICROCOMPUTER Q2 suspends detection of the terminal voltage of battery 12 from terminal f. Therefore, the voltage drop that appears after time t0 (FIG. 4) is not detected.

During the time period when detection of the terminal voltage is suspended, abnormal voltage detection circuit 32 is operational. Therefore, MICROCOMPUTER Q2 can detect abnormal increase in the battery voltage. Thus, preventing detection of the battery voltage from terminal f of MICROCOMPUTER Q2 does not harm charging safety.

At time t1 in FIG. 4, after LOAD CONTROL CIRCUIT 21 of telephone 16 is discontinued, the MICROCOMPUTER Q2 detects a change in the operational information signal which has been continuously provided to terminal g indicating the current consumption of battery 12. When current consumption returns to the original state, voltage detection of the voltage at terminal f of battery 12 is resumed.

As explained above, in the exemplary embodiment of the present invention, if operation of telephone 16 causes a change in current consumption during ongoing charging of telephone 16, the operational information signal is produced and in response, detection of battery 12 terminal voltage is suspended. Therefore, even when battery 12 terminal voltage fluctuates due to operation of telephone 16, the charging system can avoid occurrence of the erroneous "full-charge" detection. In this way incomplete charging is prevented, as well as other abnormal operating, insuring completion of safe and failure-free quick charging.

The above mentioned exemplary embodiment illustrates a constant current charging system where the output current of CURRENT CONTROL CIRCUIT 24 is fixed. The present invention also can be applied to constant voltage charging where charging is conducted with a fixed battery terminal voltage, as practiced for lithium-ion batteries and lead batteries.

The exemplary embodiment used a cordless telephone as a slave unit as an example of a load appliance. The present invention, of course it is not limited to cordless phones but may be used in many other appliances. This invention can be applied to any system where the load appliance operates when the battery charger is charging the battery, and consumption current changes depending on operation of load appliance.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A battery charging system coupled to a battery and a load appliance, said battery charging system comprising:
   power supply means for supplying a charging current to the battery to charge the battery;
   charging completion detection means for detecting completion of charging of the battery; and
   control means for suspending the detecting of the completion of charging by said charging completion detection means in response to operating of the load appliance.

2. The battery charging system according to claim 1, further including current control means for controlling charging current to the battery, and wherein the charging completion detection means generates a detection signal when at completion of charging of the battery, and wherein the control means suspends the operation of said current control means in response to the detection signal from the charging completion detection means.

3. The battery charging system according to claim 1, wherein the battery has a temperature and wherein the battery charging system further includes current control means for controlling the charging current to the battery and temperature detection means for detecting the temperature of said secondary battery and for producing a temperature detection signal, and wherein said control means suspends operation of said current control means in response to said temperature signal.

4. The battery charging system according to claim 1, wherein the load appliance includes a load control means for providing an operational information signal when said load appliance performs a predetermined operation, and wherein the control means suspends the operation of the charging completion detection means in response to the operational information signal from said load control means.

5. The battery charging system according to claim 4, wherein the load control means produces the operational information signal when the load appliance performs an operation causing consumption of an electric current.

6. The battery charging system according to claim 1, further including current detection means for detecting the charging current for the battery, wherein the detected charging detected by said current detection means is at a first level value when the load appliance is operational and at a second level value when the load appliance is not operational and wherein the control means after suspending operation a first time of the charging completion detection means causes the charging completion detection means to resume operation when an output from said current detection means detects a change in current from the second level value to the first level value.

7. A battery charging system comprising:
   power supply means for supplying a charging current to a battery connected to a load appliance;
   voltage detection means for detecting a terminal voltage of said battery; and
   control means for (1) suspending operation of said power supply means when said terminal voltage is judged to be dropping according to the detected terminal voltage from said voltage detection means, and (2) suspending the operation of said voltage detection means in response to operation of said load appliance.

8. The battery charging system according to claim 7, wherein the battery has a temperature and wherein the battery charging system further includes current control means for controlling the charging current to the battery and temperature detection means for detecting the temperature of said battery, and wherein the control means suspends operation of the current control means in response to the detected temperature from said temperature detection circuit.

9. The battery charging system according to claim 7, further including current control means for controlling the charging current to the battery and current detection means for detecting a charging current amount flowing to the battery, and wherein the control means controls said current control means in response to the detected charging current amount from said current detection means to maintain a constant charging current to the battery.

10. The battery charging system according to claim 7, wherein the load appliance includes load control means for providing an operational information signal when the load appliance performs a predetermined operation, and wherein the control means (1) suspends charging the battery when the battery terminal voltage is judged to be dropping according to the voltage detected at the voltage detection means and (2) suspends operation of the voltage detection circuit in response to the operational information signal.

11. The battery charging system according to claim 10, wherein the load control means outputs the operational information signal when the load appliance performs operations, causing a change in consumption of an electric current.

12. The battery charging system according to claim 11, further including current detection means for detecting a charging current amount flowing to the battery during charging, said charging current amount including a first level value when the appliance load is operating and a second level value when then appliance load is not operating, and wherein the control circuit, after suspending the operation of the voltage detection means, resumes operation of said voltage detection means when the current detection circuit detects a change from the first level value to the second level value.

13. A battery charging system comprising:

power supply means for supplying a charging current to a battery connected to a portable wireless telephone, said battery having a terminal voltage;

voltage detection means for detecting said terminal voltage and providing a detection signal;

load control means for providing an operational information signal when said portable wireless telephone performs a predetermined operation; and control means for (1) suspending charging when said terminal voltage is judged to be dropping according to said detection signal, and (2) suspending operation of said voltage detection means in response to said operational information signal.

14. The battery charging system according to claim 13, wherein the portable wireless telephone includes a load control means for providing the operational information signal when the portable wireless telephone performs an operation, causing an increase in consumption of an electric current.

15. The battery charging system according to claim 14, further including a current detection means for detecting a charging current amount to the battery, said charging current amount equal to a first level value when said portable telephone is operational and a second level value when said portable telephone is not operational, and wherein the control circuit, after suspending operation of the voltage detection means a first time, resuming the operation of said voltage detection circuit when said current detection means detects a transition from the first level value to the send level value.

16. The battery charging system according to claim 13, wherein load control means provides the operational information signal when the portable wireless telephone generates a beep sound.

17. The battery charging system according to claim 13, wherein said battery has a temperature and wherein said battery charging system further includes current control means for controlling the charging current to the battery and temperature detection means for detecting the temperature of said battery, and wherein the control means suspends operation of said current control means in response to the detected temperature.

18. The battery charging system according to claim 13, further including current control means for controlling the charging current to the battery and current detection means for detecting a charging current amount to the battery, and wherein the control means controls said current control means based on the detected current amount from said current detection circuit to maintain a constant charging current.

\* \* \* \* \*

UNITED STATES PATENT AND TRADE MARK OFFICE
CERTIFICATE OF CORRECTION

PATENT NO.   : 5,576,611
DATED        : November 19, 1996
INVENTOR(S)  : Yoshida It is certified that error appears in the above-identified patent and that said Letters Patent is hereby corrected as shown below:

On the cover page, item [73] Assignee, delete "Matsysguta Electric Indistrial Co., Ltd." and insert therefor --Matsushita Electric Industrial Co., Ltd.--.

Column 7, line 57, between the words "said" and "battery" delete the word "secondary".

Signed and Sealed this

First Day of July, 1997

*Attest:*

*Attesting Officer*

BRUCE LEHMAN

*Commissioner of Patents and Trademarks*